United States Patent [19]

Heyl

[11] Patent Number: 4,600,032
[45] Date of Patent: Jul. 15, 1986

[54] ROTARY SHAFT SEAL ASSEMBLY
[75] Inventor: Robert D. Heyl, Williamsport, Pa.
[73] Assignee: The Young Industries, Incorporated, Muncy, Pa.
[21] Appl. No.: 727,072
[22] Filed: Apr. 25, 1985
[51] Int. Cl.4 ............................................. F16K 43/00
[52] U.S. Cl. ..................................... 137/315; 222/368; 251/214; 251/304; 277/112; 277/124
[58] Field of Search ......................... 137/315; 222/368; 251/214, 304; 277/112, 124; 406/65

[56] References Cited

U.S. PATENT DOCUMENTS

| | | | |
|---|---|---|---|
| 2,816,693 | 12/1957 | Greaves et al. | 222/368 |
| 2,900,201 | 8/1959 | Salmon et al. | 277/112 |
| 3,069,178 | 12/1962 | Rosen | 277/124 |
| 3,130,879 | 4/1964 | Messing | 222/368 |
| 4,053,163 | 10/1977 | Vegella | 277/124 |
| 4,059,205 | 11/1977 | Heyl | 222/368 |

Primary Examiner—G. L. Walton
Attorney, Agent, or Firm—Lalos, Keegan & Kaye

[57] ABSTRACT

A rotary valve having a housing enclosing a drive shaft and a rotor assembly. The housing has an inlet, an outlet, an access end, and a detachable closure plate for closing the access end. The drive shaft, which is journalled in the housing, has a shaft end disposed generally between the inlet and the outlet and the rotor assembly is removably mounted on this shaft end. The rotor assembly has a surface including at least one recess, which is communicable with the inlet and with the outlet by rotating the drive shaft, for conveying material from the inlet to the outlet. The housing has an inwardly-disposed cylindrical surface generally concentric about the drive shaft. A teflon seal is positioned between the drive shaft and the cylindrical surface and has a seal outer surface engaging the cylindrical surface. The seal is formed of a plurality of adjacent rings configured so that they expand radially when axial pressure is applied. A retainer collar threads along the drive shaft axis and retains the seal relative to the drive shaft by applying axial pressure so that the seal rotates with the drive shaft and the seal outer surface rotates relative to, and provides a seal with, the cylindrical surface. Thus, when the closure plate is detached from the housing, the rotor assembly with the seal secured to it can be easily removed from the housing out the access end, the seal slid off, cleaned and mounted back on the rotor assembly.

16 Claims, 5 Drawing Figures

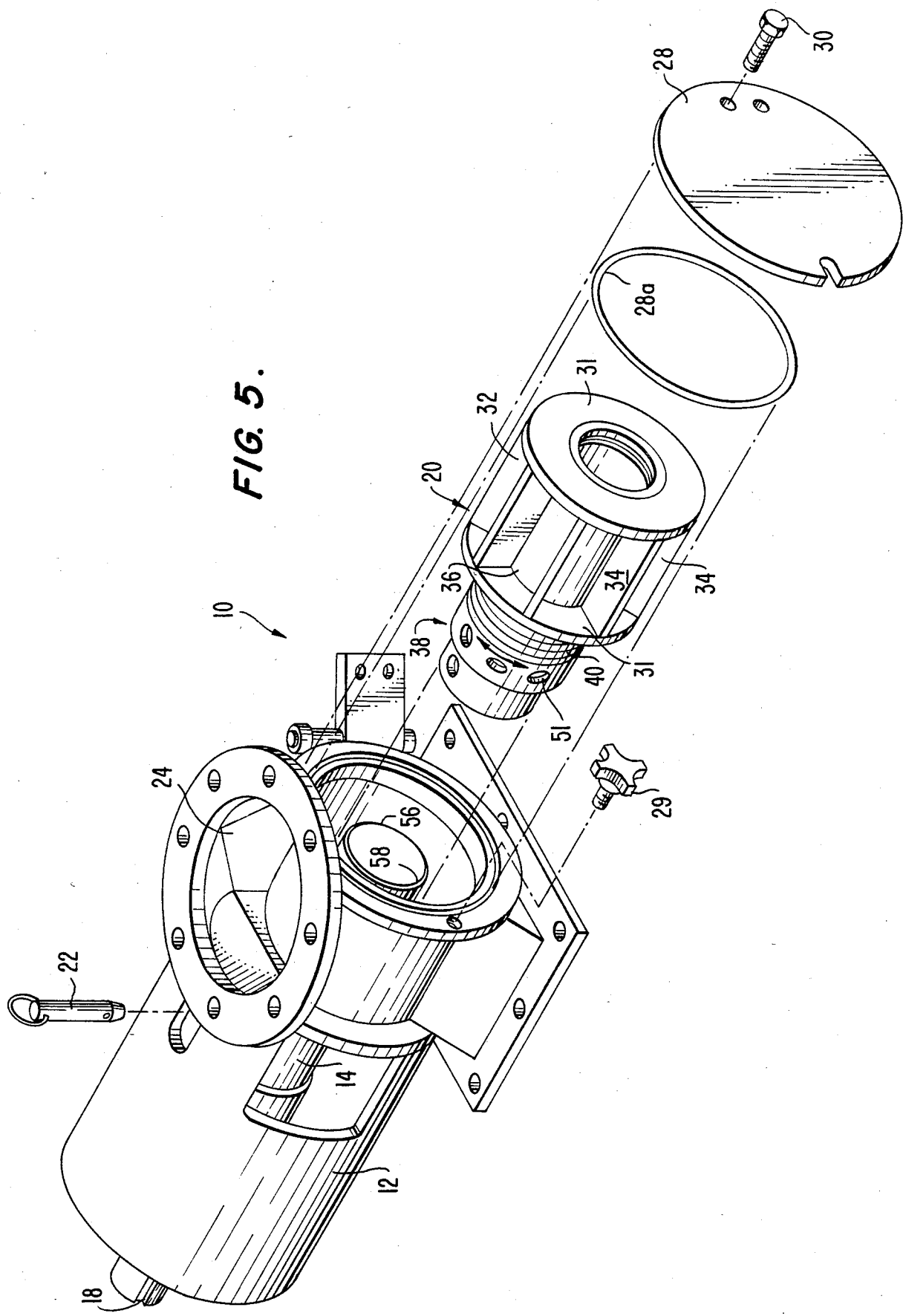

ROTARY SHAFT SEAL ASSEMBLY

BACKGROUND OF THE INVENTION

This invention relates to rotary valves which permit quick and easy disassembly and access to the interior of the valve for inspection, seal maintenance and cleaning without requiring the removal of the valve from the installed position. The invention further relates to rotary valves which are useful in handling food stuffs or materials which will not tolerate cross-batch contamination, such as when colors must be frequently changed. The invention further contemplates a shaft seal assembly for such a rotary valve.

In many rotary valve applications, frequent cleaning of the internal valve parts is required; particularly, in those applications which require the handling of a food stuff or materials which will not tolerate cross-batch contamination. To achieve a thorough cleaning of all internal valve surfaces, it has been necessary in the past to completely disassemble the valves. Existing rotary valve designs do not provide a means for quick removal of the seal for cleaning, inspection and replacement. Seals are normally located between a bearing and the device with limited space for access to the seal, making seal removal very difficult. Frequently the seal is destroyed when removed because of the limited workspace.

More particularly, seals in the past have consisted of braided packing, Chevron packing or the like which are held in place by a close fit between the outer diameter of the seal and the inner diameter of the seal housing. The shaft rotates and the seal is stationary with sealing occurring between the seal inner diameter and the shaft outer diameter. This design does not permit the seal to be removed and replaced as an assembled unit.

OBJECTS OF THE INVENTION

Accordingly, it is the principal object of the present invention to provide a novel rotary valve.

Another object of the present invention is to provide a novel shaft seal assembly for a rotary feeding or air lock valve.

A further object of the present invention is to provide a means of sealing a rotating shaft with a seal that can be removed easily and quickly for cleaning, inspection or replacement.

A still further object of the present invention is to provide a novel rotary shaft seal assembly which allows the rotor and seal to be removed as an assembled unit and thus allowing the seal to be easily accessed and cleaned without damaging the seal.

Another object is to provide an improved shaft seal assembly which can be taken apart, cleaned and put back together by an operator having minimal mechanical skills.

A further object is to provide an improved rotary valve which is acceptable to the food industry where sanitary standards apply.

A still further object is to provide for a valve, which handles dry free-flowing products, a novel shaft seal assembly which maintains high operating pressures.

Other objects and advantages of the present invention will become more apparent to those having ordinary skill in the art to which the invention pertains from the following description taken in conjunction with the accompanying drawings.

BRIEF DESCRIPTION OF THE DRAWINGS

FIG. 5 is an exploded perspective view of the rotary valve embodying the present invention as shown in FIG. 1.

DESCRIPTION OF THE PREFERRED EMBODIMENT

Figure 1:
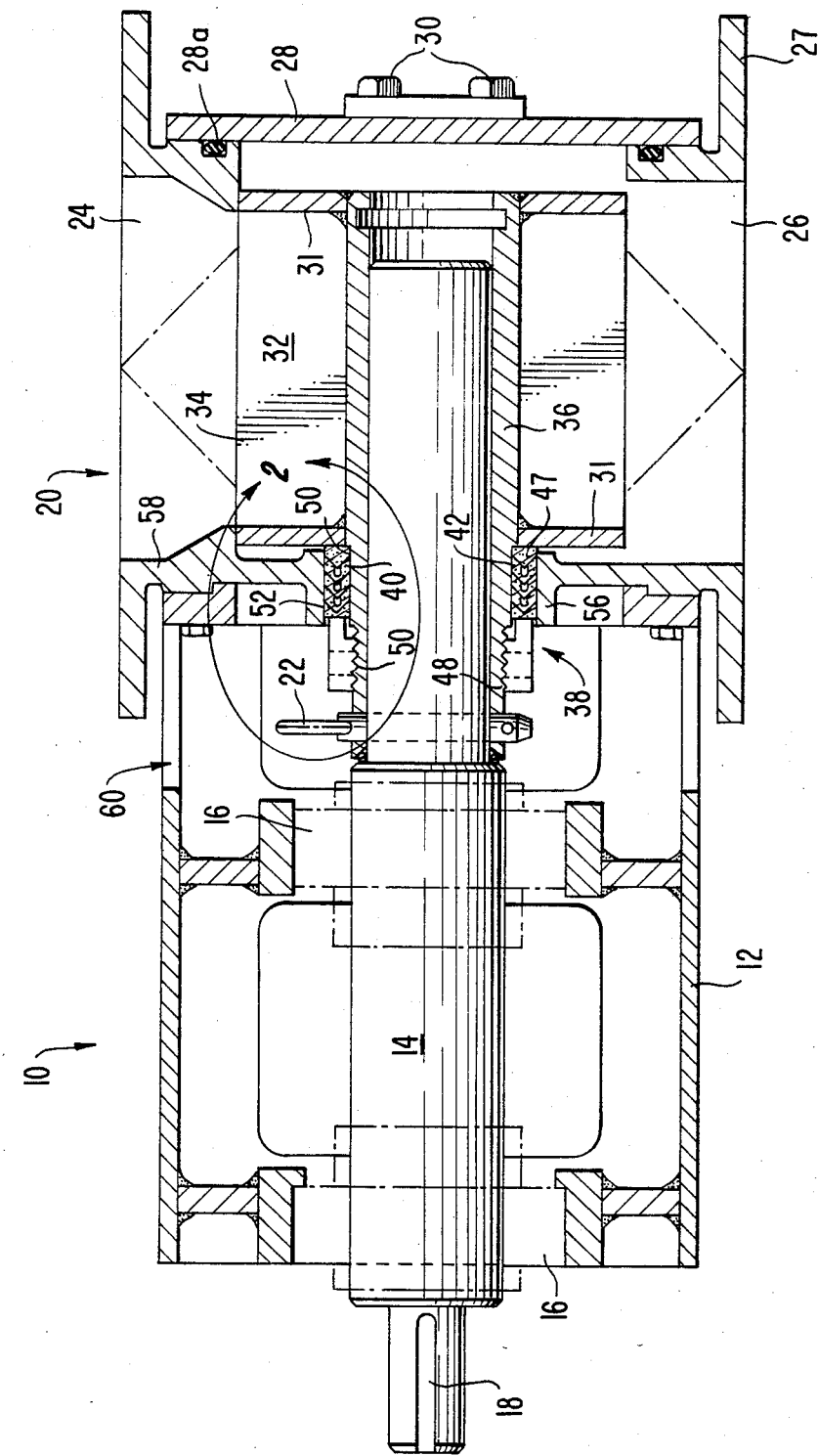
FIG. 1 is a cross-sectional view of a rotary valve constructed in accordance with the present invention.

A rotary valve of the present invention is illustrated in the accompanying drawings generally at 10. Valve 10 comprises a housing 12 which supports a drive shaft 14 on a pair of spaced bearing support rings 16 mounted in housing 12 at one end thereof. A key way 18 is provided at one end of drive shaft 14 to which the pulley of an electrical motor or other suitable driving means can be directly connected for rotating drive shaft 14 within housing 12. At the other end of drive shaft 14 is mounted a rotor assembly shown generally at 20 and secured to drive shaft 14 by a removable pin 22. Pin 22 extends all of the way through drive shaft 14 and prevents rotor assembly 20 from slipping on drive shaft 14 as it rotates. Housing 12 further has an inlet 24 and an opposite outlet 26 through base flange 27 on the housing end which is opposite bearing support rings 16. Rotor assembly 20 defines a passageway for communicating inlet 24 with outlet 26. Housing 12 also includes a detachable end plate 28 and a plate sealing ring 28a which, when detached from the end of the housing 12 by rotating threaded handle 29, and unbolting the bolts 30, allows rotor assembly 20 to be easily removed from the interior of housing 12, as best shown in FIG. 5.

Rotor assembly 20 includes a pair of end disc plates 31 which close its ends and help define the recesses or compartments 32 of the rotor assembly. Compartments 32 are further defined by the plurality of vanes 34 extending between end plates 31 and mounted radially by welding to rotor hub 36. Although generally any number of vanes can be used, it is anticipated that eight will be provided. As dry, free-flowing material passes through inlet 24 of housing 12 and into the adjacent compartment 32 defined between adjacent vanes 34, compartment 32 will become at least partially filled with the material. Then as drive shaft 14 rotates rotor assembly 20, compartment 32 will be moved until it communicates with outlet 26 and the material will then pass out through the outlet in a conventional manner.

Figure 2:
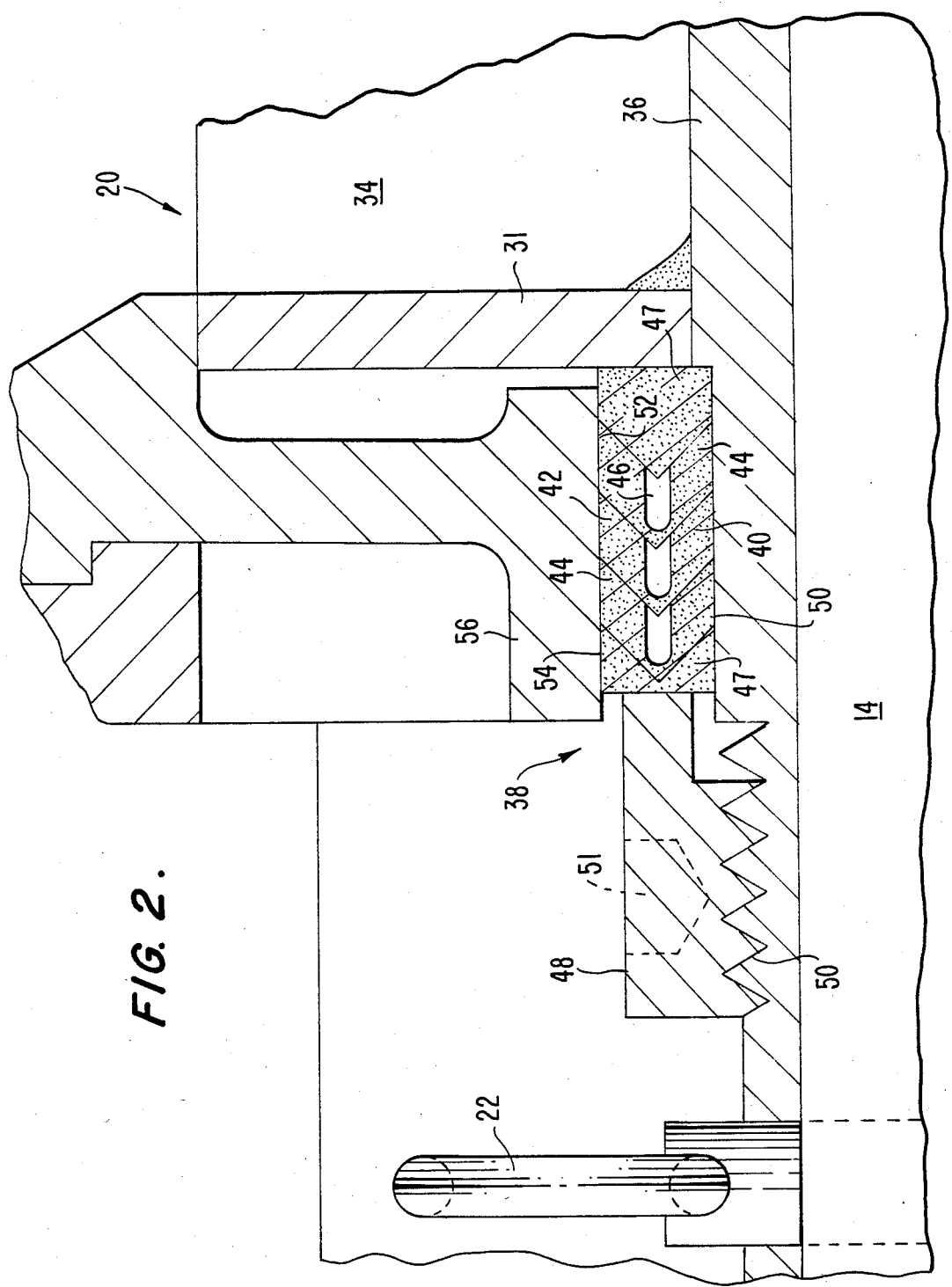
FIG. 2 is an enlarged sectional view taken about line 2 of FIG. 1 illustrating the sealing assembly in larger detail.
Figure 3:
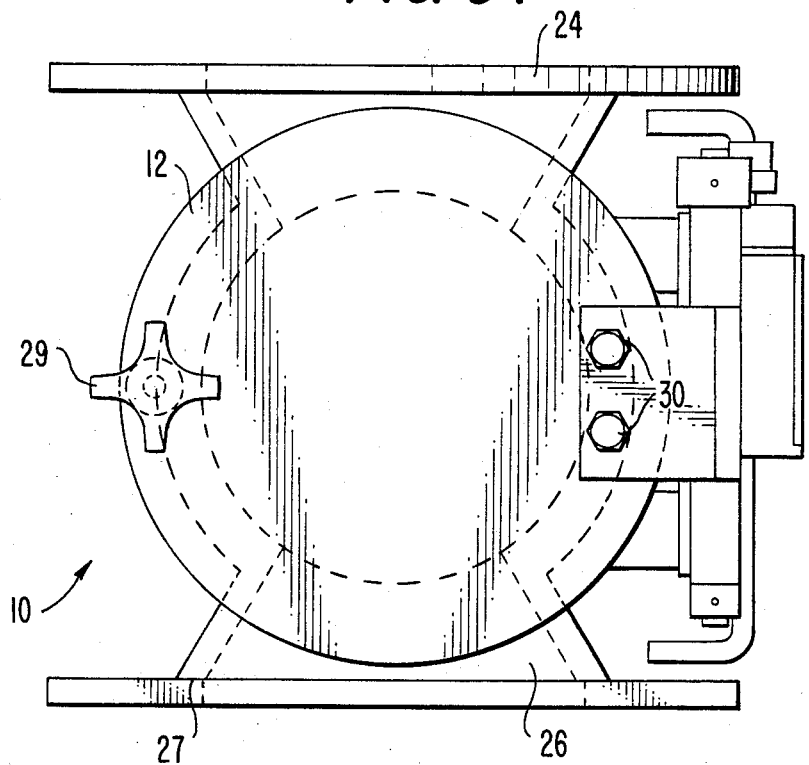
FIG. 3 is a front end view of the rotary valve of FIG. 1.
Figure 4:
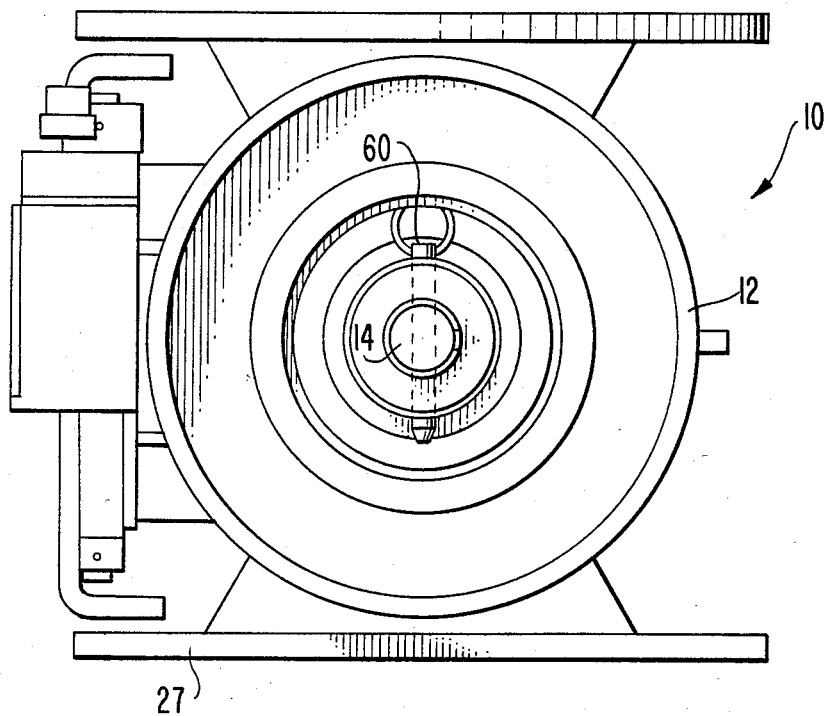
FIG. 4 is a rear end view of the rotary valve of FIG. 1.

Rotor assembly 20 rotates relative to housing 12 about a drive shaft seal assembly shown generally at 38 and shown in enlarged detail in FIG. 2. Drive shaft seal assembly 38 prevents the influx of gases and particulate matter from the rotor area into the interior of housing 12 adjacent bearing support rings 16. Drive shaft seal assembly 38 includes a Teflon or nylon seal 40 such as the "Garlock XV CHRVRON TFE Packing", which consists of a plurality of rings. The inner rings 42 of seal 40 are shown in FIG. 2 to comprise wedge-shaped members 44 having interior hinges 46 and outer end rings 47 of seal 40 are positioned on the outside ends of inner rings 42 to hold them together. This type of seal can be readily slid off of rotor assembly 20, disassembled into its individual rings, cleaned and put back together with a minimum of operator mechanical aptitude. Regular packing in the past were commonly abraided such that the product, such as milk powder, would get in the surface texture, and could not be cleaned out so that the seal would periodically have to be replaced.

Seal 40 abuts against end disc plate 31 of rotor assembly 20 at one end and against a threaded collar 48 at the other end. Threaded collar 48 screws on the corresponding threads 50 of rotor assembly 20 along the axis of drive shaft 14. Holes 51 can be provided in threaded collar 48 into which a pin can be inserted and turned for screwing threaded collar 48 about the drive shaft. Thus, the position of threaded collar 48 along the longitudinal axis of drive shaft 14 can be adjusted and thereby the selected driving force applied against the end of seal 40 towards end plate 31. As collar 48 is threaded closer against seal 40 towards end plate 31, it exerts axial pressure and retains seal 40 securely against rotor assembly 20 on rotor surface 51 so that seal 40 will rotate with rotor assembly 20 and with drive shaft 14. Seal 40 expands radially as it is compressed at its ends.

The outer surface 52 of seal 40 abuts directly against the inner surface 54 of a polished cylinder 56, which is secured to the housing outer surface by a fixed housing end plate 58, which also supports in part drive shaft 14. Thus, the sealing action of seal 40 takes place about the outer diameter or surface 52 of seal 40, against inner surface 58 of cylinder 56. As shown, cylinder inner surface 58 defines an interior diameter which is greater than the largest exterior diameter of threaded collar 48 so that when the entire rotor assembly 20 is removed from housing 12 through the opened detachable end plate 28, after pin 22 has been removed through opening 60 in housing 12, collar 48 will pass freely through cylinder 56. Accordingly, when detachable end plate 28 is detached from housing 12, rotor assembly 20 and seal 40 can be removed axially together out through the open end thereby defined in housing 12. Thus, the rotor assembly and seal will be out front readily accessible for ease of cleaning, maintenance, and seal replacement, if needed.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the appended claims.

I claim:

1. A rotary valve comprising:
    a housing including an inlet, an outlet, and an access end,
    a detachable closure means attached to said housing for closing said access end,
    a drive shaft journalled in said housing and having a shaft end disposed generally between said inlet and said outlet,
    a rotor mounted on said shaft end and having a surface including at least one recess, which is communicable with said inlet and with said outlet by rotating said drive shaft, for conveying material from said inlet to said outlet, said rotor being mounted directly on said shaft end by a releasable means,
    said housing including a surface defining means for defining an inwardly-disposed cylindrical surface generally concentric about said drive shaft,
    a seal positioned between said drive shaft and said cylindrical surface and having a seal outer surface engaging said cylindrical surface;
    a retaining means for retaining said seal directly on said rotor and relative to said drive shaft so that said seal rotates with said drive shaft and said seal outer surface rotates relative to, and provides a seal with, said cylindrical surface, and said rotor and said seal being removable from said housing as a single unit upon the removal of only said closure means and said releasable means for cleaning and/or repair of said single unit.

2. The valve of claim 1 including,
    said housing including a fixed end plate, and
    said defining means including a cylindrical member mounted to said fixed end plate and positioned concentrically about said drive shaft.

3. The valve of claim 1 including,
    said rotor having a rotor outer surface, and
    said seal having a seal inner surface positioned against said rotor outer surface.

4. The valve of claim 3 including,
    said seal having a seal outer end and a seal inner end, and
    said rotor having a shoulder against which said seal outer end abuts when retained by said retaining means.

5. The valve of claim 4 including,
    said retaining means including an adjustable collar positionable along the longitudinal axis of said drive shaft and when positioned closer to said shoulder pressing against said seal outer end, thereby forcing said seal inner end against said shoulder and causing said seal to radially expand and said seal outer surface to engage said cylindrical surface.

6. The valve of claim 5 including,
    said cylindrical surface having an interior diameter and
    said collar having its largest exterior diameter being less than said cylindrical surface interior diameter.

7. The valve of claim 6 including,
    said retaining means retaining said seal on a hub portion of said rotor such that, when said detachable closure means is open and said rotor is removed from said housing out said access end, said seal moves therewith out said access end.

8. The valve of claim 1 including,
    said retaining means retaining said seal on a hub portion of said rotor such that, when said detachable closure means is open and said rotor is removed from said housing out said access end, said seal moves therewith out said access end.

9. The valve of claim 1 including,
    a securing means for securing said rotor to said shaft.

10. The valve of claim 9 including,
    said seal being positioned between said securing means and said closure means.

11. The valve of claim 10 including,
    said housing including an outer surface and an opening through said outer surface for providing access to said securing means.

12. The valve of claim 10 including,
    said seal comprising a plurality of rings having wedge-shaped surfaces adapted to mate against one another and allowing radial expansion of said rings when said retaining means applies axial pressure against them.

13. The valve of claim 12 including,
said rings being constructed of Teflon, and
said rings including hinges which, as said retaining means applies axial pressure against said seal, straighten out thereby radially expanding said rings.

14. The valve of claim 1 including,
a securing means for securing said rotor to said drive shaft, and
said retaining means being positioned between said securing means and said shaft end.

15. The valve of claim 14 including,
said shaft including an enlarged shaft shoulder, and
said rotor including a rotor end adjacent said securing means and abutting against said shaft shoulder.

16. A rotary valve comprising:
a housing including an inlet, an outlet, and an access opening;
a detachable closure means attached to said housing for closing said access opening;
a drive shaft journalled in said housing and having a shaft end disposed generally between said inlet and said outlet and in alignment with said access opening;
a rotor on said shaft end adjacent said access opening and having a surface including at least one recess which is communicable with said inlet and with said outlet during rotation of said rotor for conveying material from said inlet to said outlet,
releasable means mounting the rotor directly on the shaft end for rotation therewith,
said housing including a surface defining means for presenting an inwardly-disposed cylindrical surface disposed in generally concentric radially spaced relationship around said drive shaft;
a seal positioned between said drive shaft and said cylindrical surface and having an outer sealing surface engaging said cylindrical surface; and
a retaining means carried by the rotor for retaining said seal directly on said rotor and relative to said drive shaft so that said seal rotates with said rotor and said outer sealing surface rotates relative to and provides a seal with respect to said cylindrical surface,
said seal, said rotor and said retaining means being removable from the housing through the access opening as a single unit upon release of only the releasable means.

* * * * *